United States Patent
Stefan et al.

(10) Patent No.: US 6,466,864 B1
(45) Date of Patent: Oct. 15, 2002

(54) METHOD AND SYSTEM FOR DETECTING ANOMALOUS ROAD GEOMETRY FOR A NAVIGATION SYSTEM

(75) Inventors: Jeffrey M. Stefan, Clawson; Jasmin Jijina, West Bloomfield; Richard J. Kacel, Waterford; Daniel N. Aloi, Rochester Hills; John J. Correia, Livonia, all of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/000,269

(22) Filed: Nov. 2, 2001

(51) Int. Cl.[7] ............................................... G01C 21/36
(52) U.S. Cl. ....................................................... 701/200
(58) Field of Search ................................ 701/200, 201, 701/205, 208; 73/178 R

(56) References Cited

U.S. PATENT DOCUMENTS

| | | | | |
|---|---|---|---|---|
| 5,317,937 A | * | 6/1994 | Yoshizawa et al. | 477/120 |
| 5,432,700 A | * | 7/1995 | Hrovat et al. | 280/5.515 |
| 5,684,696 A | * | 11/1997 | Rao et al. | 318/587 |
| 5,848,374 A | * | 12/1998 | Wakabayashi et al. | 340/990 |

* cited by examiner

*Primary Examiner*—William A. Cuchlinski, Jr.
*Assistant Examiner*—Olga Hernandez
(74) *Attorney, Agent, or Firm*—Anthony Luke Simon

(57) ABSTRACT

The present invention provides a system, a method and a computer usable medium including a program for providing road condition information to a mobile vehicle. This may be done by receiving a plurality of road points, determining a road profile value based on at least a portion of the road points and determining whether the road profile value exceeds a road profile threshold value. It may also be done by computing a suggested vehicle speed, when the road profile value exceeds the road profile threshold value, comparing the suggested vehicle speed to a sensed vehicle speed and sending an excessive speed alert to the vehicle based on the comparison.

20 Claims, 7 Drawing Sheets

300

400

500

METHOD AND SYSTEM FOR DETECTING ANOMALOUS ROAD GEOMETRY FOR A NAVIGATION SYSTEM

FIELD OF THE INVENTION

This invention relates generally to the navigation of a moving vehicle. In particular, this invention relates to a method and system for detecting geometric anomalies on a road that provide useful navigational information to a moving vehicle.

BACKGROUND OF THE INVENTION

Digital map databases typically provide enough information to determine accurately road geometry. Often, this information does not provide any advance warning or information about a severe change in upcoming road geometry. Severe road changes may be a result of inclement weather or construction. Information about the upcoming geography may be especially beneficial if the condition is a steep upgrade or downgrade. Ideally, this type of information may be used to control or influence vehicle speed when given road conditions require slower speed.

It would be desirable, therefore, to provide a method for detecting geometric anomalies on a road, providing useful information to a moving vehicle that overcomes the above-mentioned navigational difficulties.

SUMMARY OF THE INVENTION

One aspect of the present invention provides a method for providing road condition information to a mobile vehicle. A plurality of road points is received on the vehicle client from the navigation subsystem server. A road profile value based on at least a portion of the road points is determined and it is determined whether the road profile value exceeds the road profile threshold value. A suggested vehicle speed may be computed when the road profile value exceeds the road profile threshold value. The suggested vehicle speed is compared to a sensed vehicle speed, and an excessive speed alert is sent to the vehicle based on the comparison.

Another aspect of the present invention provides a system for providing road condition information to a mobile vehicle. The system may include means for receiving a plurality of road points for determining a road profile value based on at least a portion of the road points, and for determining whether the road profile value exceeds a road profile threshold value. It may also include means for computing a suggested vehicle speed when the road profile value exceeds the road profile threshold value, by comparing the suggested vehicle speed to a sensed vehicle speed, and then sending an excessive speed alert to the vehicle based on the comparison.

Another aspect of the present invention provides a computer usable medium including a program for providing road condition information to a mobile vehicle. The program may include computer readable program code that determines a road profile value based on at least a portion of received road points, computer readable program code that determines whether the road profile value exceeds a road profile threshold value and computer readable program code that computes a suggested vehicle speed when the road profile value exceeds the road profile threshold value. It may also include computer readable program code that compares the suggested vehicle speed to a sensed vehicle speed and computer readable program code that sends an excessive speed vehicle alert based on the comparison.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
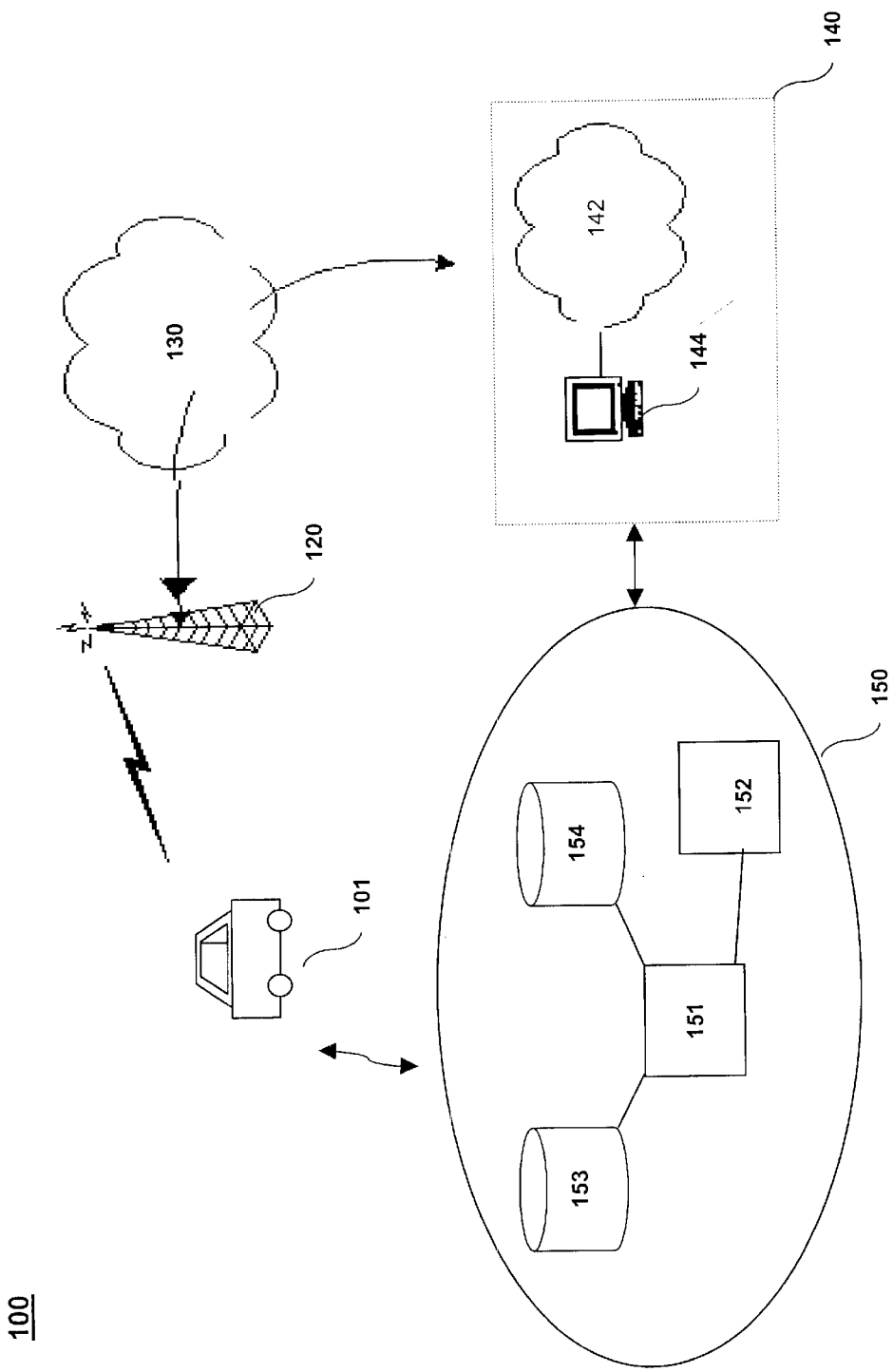
FIG. 1 is a schematic diagram of a system for providing road condition information to a mobile vehicle in accordance with the present invention.

FIG. 1 shows one embodiment of a system for providing road condition information to a mobile vehicle in accordance with the present invention at 100. The system may include one or more vehicle clients 110, one or more carrier systems 120, one or more communication networks 130, one or more service management subsystems 140, and one or more navigation subsystems 150. The service management subsystems may comprise one or more service management applications 142 and one or more service managers 144. The navigation subsystems 150 may comprise one or more route applications 151, 152 and one or more coordinate databases 153, 154.

Navigation subsystem 150 is a system for generating routes to be delivered to vehicle client 110 and for receiving route information from vehicle client 110. Navigation subsystem 150 may be connected with or in communication with service management subsystem 140. Service management subsystem 140 may be used to manage the delivery of information to or from navigation subsystem 150 to other parts of system 100. Routes may be delivered or information may be received via a live agent, such as a human advisor, or via a virtual agent, such as an interactive computer program.

Navigation subsystem 150 may be any suitable hardware or software configuration, or combination of hardware and software that is configured to generate a route, process route information or receive information from vehicle client 110.

In one embodiment of the invention, navigation subsystem 150 comprises one or more route applications 151, 152 and one or more coordinate databases 153, 154. For example, route applications 151, 152 may be any suitable software application for generating route information or otherwise processing route information. Coordinate databases 153, 154 may be any suitable databases for storing route information, such as location coordinates.

Vehicle client 110 may be any suitable vehicle. For example, the vehicle may be an automobile or a passenger-carrying unit such as a bus or train. Alternatively, vehicle client 110 may be an occupant of the vehicle or any suitable client device contained in the vehicle. In one embodiment of the invention, vehicle client 110 is a mobile or portable device equipped to communicate with service management subsystem 140. Carrier system 120 is any suitable system for transmitting a signal from vehicle 110 to service management subsystem 140. Carrier system 120 may also transmit a signal from service management subsystem 140 to vehicle client 110. In one embodiment of the invention, carrier system 120 is a wireless carrier system as is well known in the art. Carrier system 120 may be, for example, a transmitter/receiver unit attached to vehicle client 110. Alternatively, carrier system 120 may be a separate transmitter/receiver carried by vehicle client 110.

Communication network 130 is any suitable system for communicating between vehicle client 110 and service management subsystem 140. In one embodiment of the invention, communication network is a public switched telephone network (PSTN). Alternatively, communication network 130 may be multiprotocol Internet or intranet capable of transmitting voice and/or data in either analog or digital form or a combination of both. Alternatively, communication network 130 may be a hybrid communication network or virtual network.

Service management subsystem 140 is a system for managing a variety of services to be delivered to or from vehicle client 110. In one embodiment of the invention, service management subsystem 140 manages services that may be distributed over a variety of channels. For example, services may be delivered via a live agent, such as a human advisor, or via a virtual agent, such as an interactive computer program. The structure of service management subsystem 140 may enable services to be delivered in a uniform manner regardless of the channel used for delivery or of the service being delivered. Service management subsystem 140 may maintain a consistent subscriber experience and "look and feel" across the products being delivered across the service distribution channels enabled.

Figure 2:
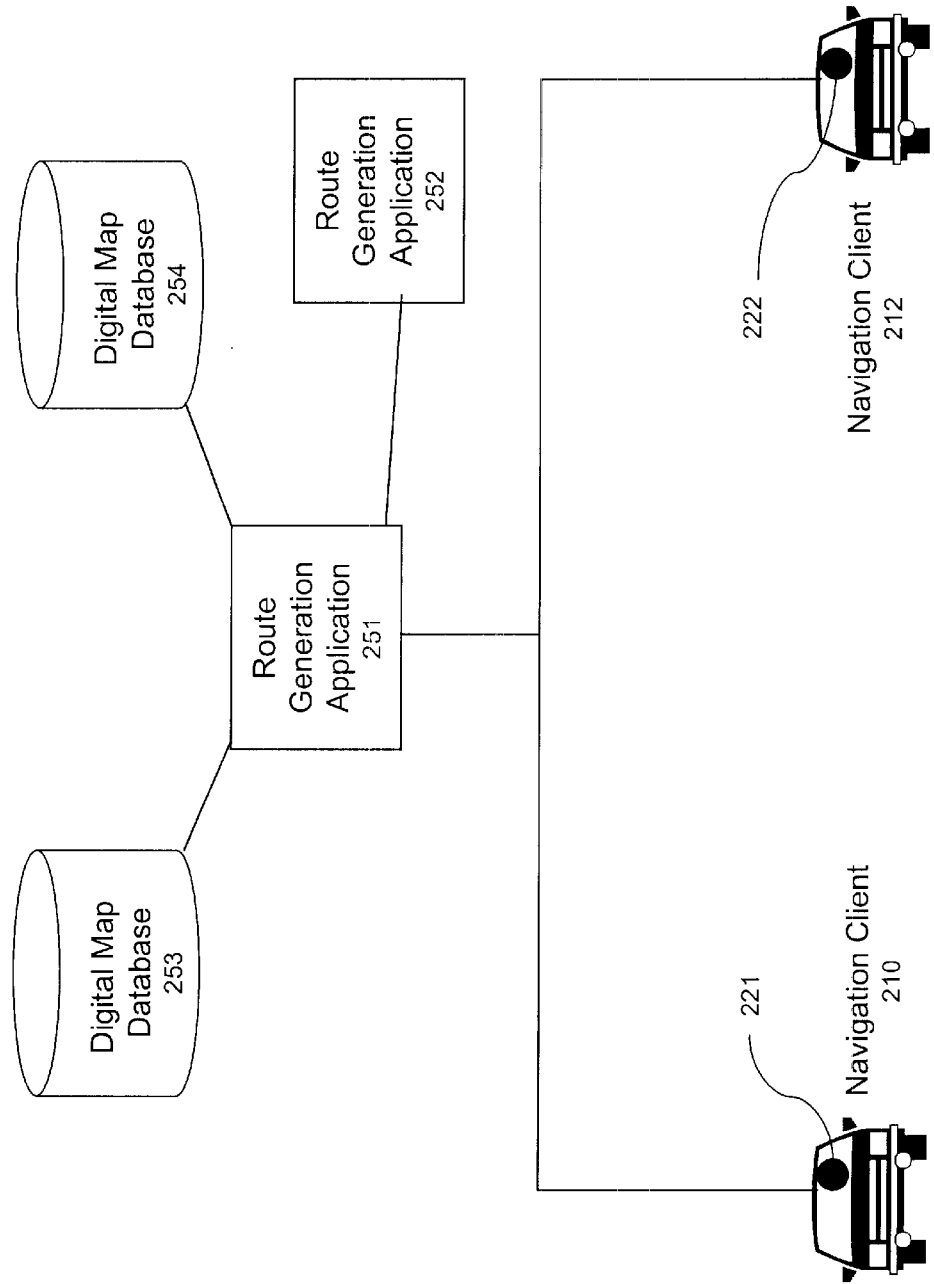
FIG. 2 is a schematic diagram of another embodiment of a system for providing road condition information to mobile vehicle in accordance with the present invention.

FIG. 2 shows one embodiment of providing road condition information to a mobile vehicle in accordance with the present invention at 200. Navigation system 200 may include one or more navigation clients 210, 212. Each navigation client 210, 212 may have an in-vehicle navigator 221, 222. Navigation system 200 may also include one or more route generation applications 251, 252. Navigation system 200 may also include one or more coordinate databases 253, 254.

Navigation clients 210, 212 may be one or more vehicle clients as described above.

In-vehicle navigator 221, 222 may be any suitable component of navigation client 210, 212, which may be used to navigate vehicle client 210, 212. For example, in-vehicle navigator 221, 222 may be a driver. Alternatively, in-vehicle navigator 221, 222 may be an automatic system for navigating vehicle 210, 212.

Route generation applications 251, 252 may be any suitable application for calculating maneuver lists of directions between one or more locations. For example, route generation applications 251, 252 may be any suitable software or hardware programs for managing or calculating routes, portions of route or route coordinates. Route generation applications may include or be able to calculate routes from current location of navigation client 210, 212 to private residences, businesses or recreational facilities. In one embodiment of the invention, route generation applications 251, 252 are in communication with coordinate databases 253, 254.

Route generation applications 251, 252 may generate navigation information in any suitable manner. For example, route generation applications 251, 252 may generate routes using geocoding by determining a corresponding latitude and longitude based on an input navigation address. Alternatively, route generation applications 251, 252 may generate routes using reverse geocoding by determining a corresponding navigation address based on input latitudinal and longitudinal coordinates.

Coordinate databases 253, 254 may be any suitable databases for storing latitudinal and longitudinal coordinates for a variety of locations. These locations may be, for example, points of interest. Coordinate databases 253, 254 may also be a database of street addresses. Coordinate databases 253, 254 may also be a database of routes between points.

Figure 3:
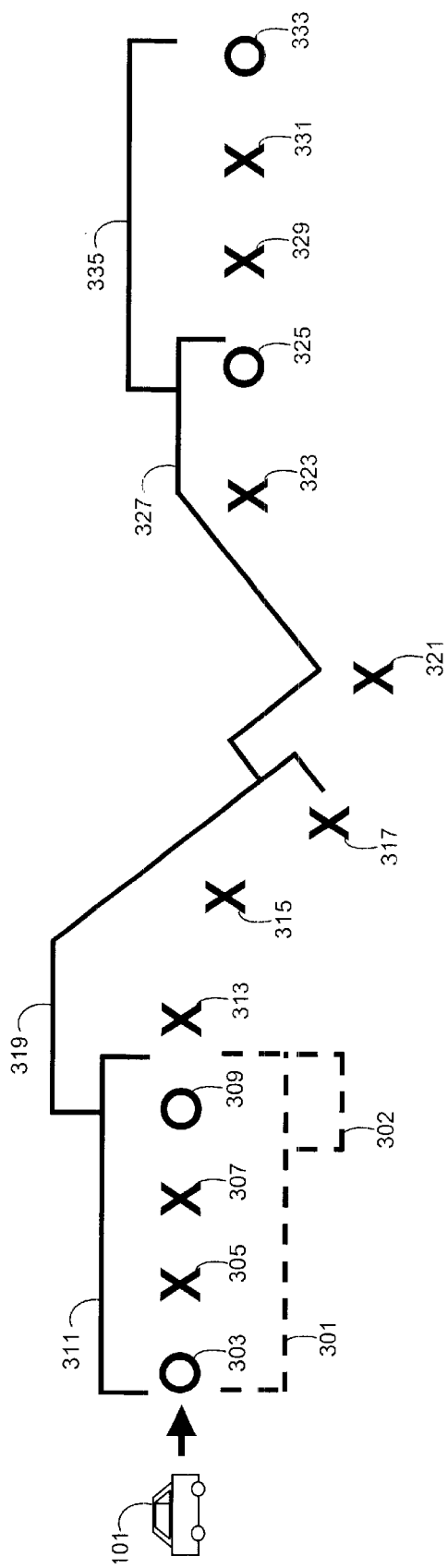
FIG. 3 is a sequence diagram, illustrating an example of one embodiment of a method for providing road condition information to a mobile vehicle in accordance with the present invention.

FIG. 3 shows one embodiment of providing road condition information to a mobile vehicle in accordance with the present invention at 300. Road segments may be portions of a road usually bounded by nodes and may be represented by longitudinal and latitudinal values. Points 305, 307, 313, 315, 317, 321, 323, 329, 331 may be shape points which may be longitudinal and latitudinal values located within a road segment, and may define the road segment geometry. Points 303, 309, 325, 333 may be maneuver points located at various intersections. Before vehicle 101 begins to navigate, a road profile threshold value may be downloaded from a configuration table located in the digital map database 253, 254. This threshold may represent an angular lower limit, which when exceeded, identifies that the current road segment has a substantial change in geometry. A road profile value, which may be the bearing angle between the first two consecutive shape points 305, 307, may be calculated as vehicle 101 navigates along a path represented by road points 303, 305, 307, 309, 313, 315, 317, 321, 323, 325, 329, 331, 333. It may be determined whether this angle exceeds the road profile threshold and when it is determined that it does exceed the road profile threshold, the road segment that is currently being navigated may be identified as an anomalous road segment with a severe change in road geometry. This analysis may be repeated on the consecutive pairs of shape points 305, 307 and so forth, until all of the shape points within a predetermined sliding window 311, 319, 327, 335 have been analyzed. The sliding window 311, 319, 327, 335 may represent m, a constant representing a predetermined quantity of road points. Of these road points, the last road point 309, 317, 325, 333 in each sliding window may be an overlap point 302, where n, a constant representing the number of overlap points may also be predetermined. The values for m and n are downloaded from the navigation system 150 before the vehicle begins navigation. When the overlap point 309, 317, 325, 333 is reached a new window may be generated.

Figure 4:
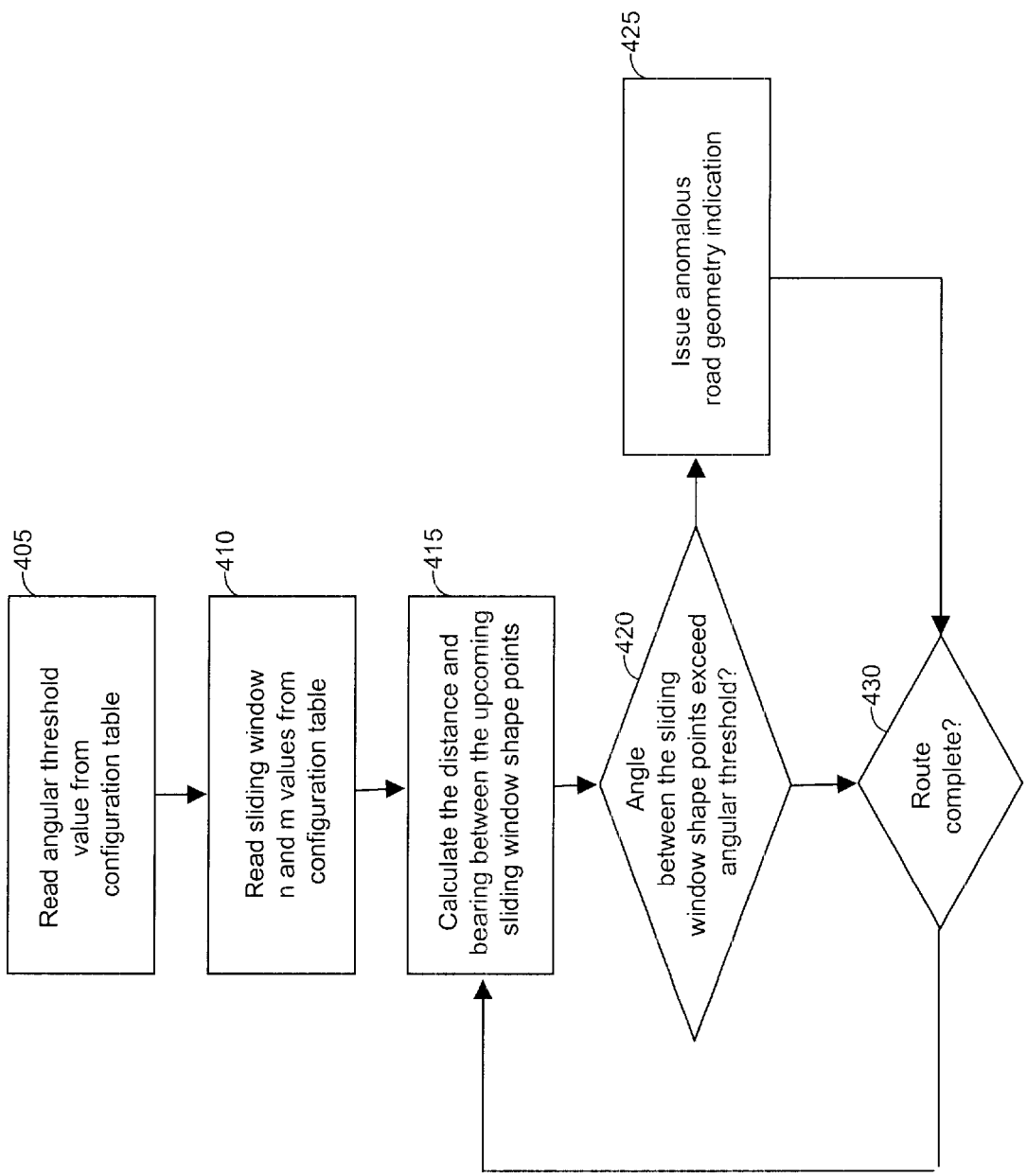
FIG. 4 shows a flow diagram of one embodiment of a method for providing road condition information to a mobile vehicle in accordance with the present invention.

FIG. 4 shows one embodiment of a method for providing road condition information to a mobile vehicle in accordance with the present invention at 400. As the vehicle client 101 is navigating, a road profile threshold may be downloaded to the vehicle from a general data store configuration table located on the navigation server subsystem 150 (block 405). A sliding window value n and an overlap value m may be downloaded from a configuration table located on the navigation server subsystem 150 (block 410). A distance and bearing may be calculated between upcoming shape points located in the current sliding window (block 415). It may be determined when the road profile angle located between the sliding window shape points exceeds the predetermined road profile threshold value (block 420). If it is determined that the road profile value exceeds the road profile threshold, an anomalous road geometry indication may be issued (block 425). When the road profile value does not exceed the road profile threshold, it may be determined if the vehicle has completed the route being navigated (block 430). If the route has not been completed then the distance and bearing may be calculated for the next shape points located in the sliding window.

Figure 5:
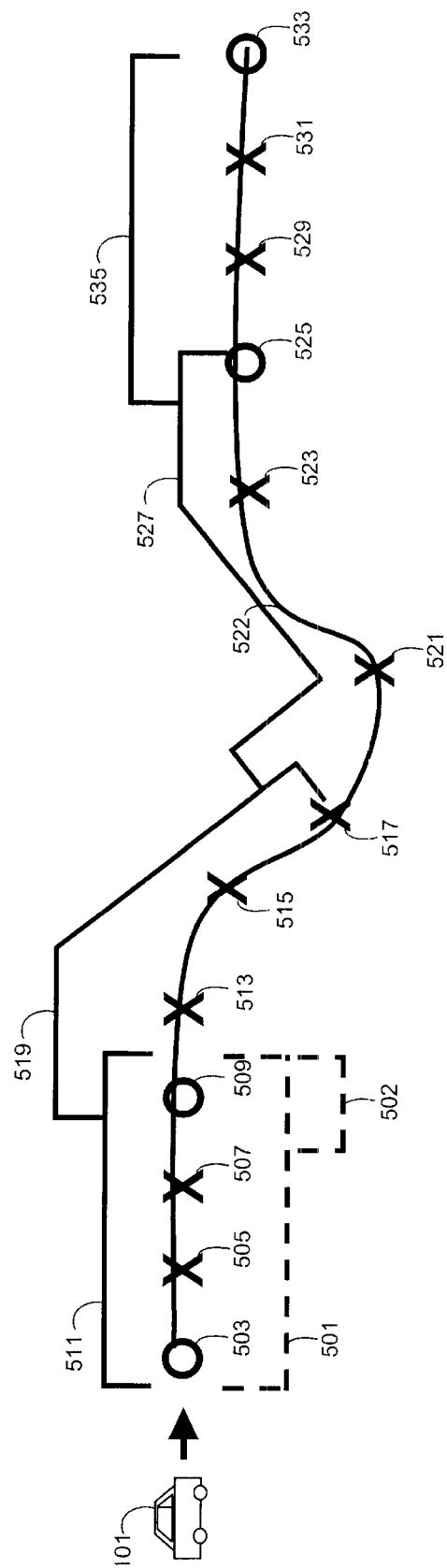
FIG. 5 is a sequence diagram, illustrating an example of one embodiment of a method for providing road condition information to a mobile vehicle in accordance with the present invention.

FIG. 5 shows one embodiment of a method for providing road condition information to a mobile vehicle in accordance with the present invention at 500. A set of data points may correspond to the shape points 505, 507, 513, 515, 517, 521, 523, 529, 531 that are identified in the sliding window 511, 519, 527, 535. These data points, which are located in a general data store of the navigation system server 150, may be fit to a mathematical function. The identified shape points may be highlighted and connected to form a curve 522. The curve 522 may be analyzed using calculus methods known in the art. Several curve fitting methods may be employed to estimate the road geometry. The preferred embodiment is the least squares method, which may be represented by a mathematical function resembling:

$$y = a_0 + a_1 x + a_2 x^{2} + a_3 x^{3} + \cdots$$

where the coefficients $a_0$, $a_1$, $a_2$, and $a_3$ may be used to identify stationary points along the curve and the amplitude of the points along the curve.

Information about the amplitude of the portion of the curve 522 may be determined by using simple calculus to manipulate the equation.

The severity of the undulation of the portion of the curve defined by the shape points in the sliding window may be determined by the equation:

$$R = (d^*A)/D$$

where R is the road profile value or severity of undulation; d is the degree of polynomial; A is the average perpendicular distance between the undulation peaks and troughs from the x axis; and D is the distance between the west-most shape point and the east-most shape point.

Figure 6:
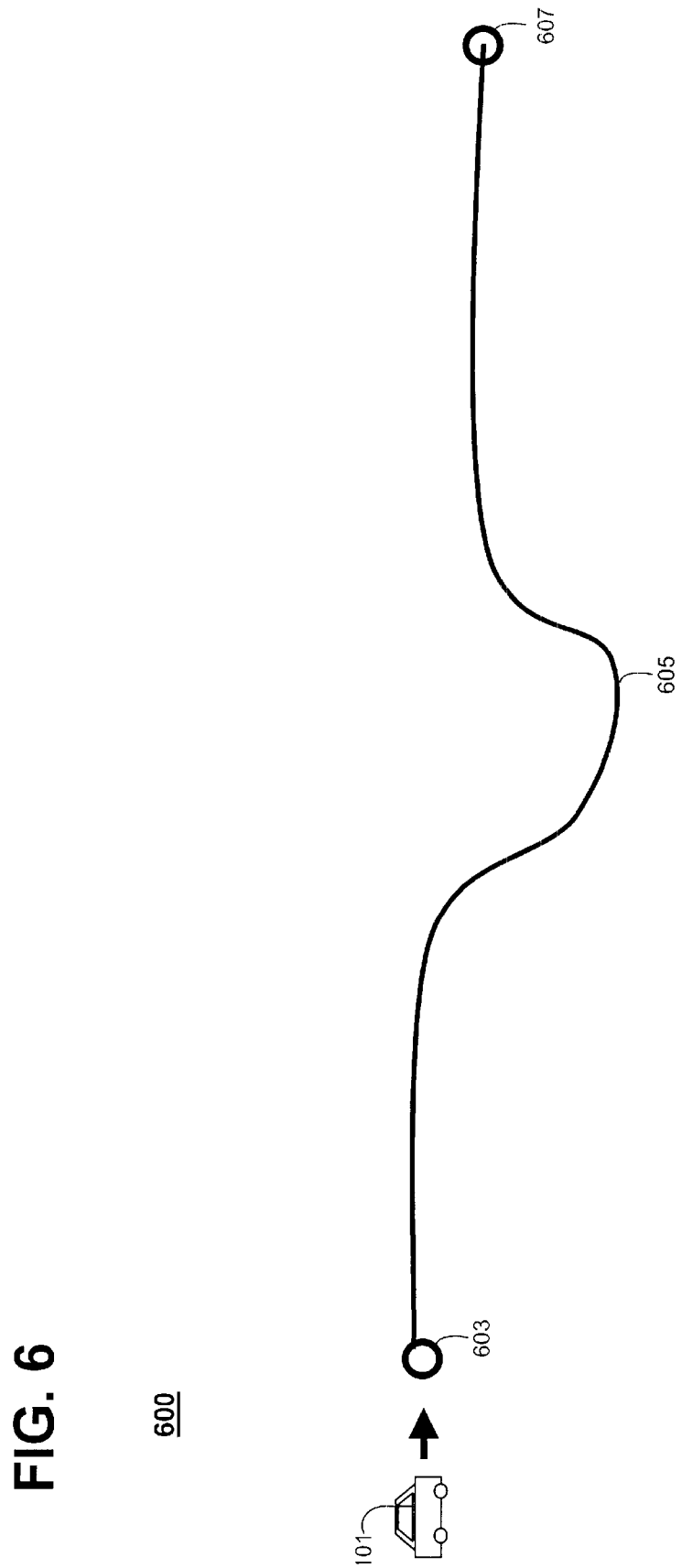
FIG. 6 is a sequence diagram, illustrating an example of one embodiment of a method for providing road condition information to a mobile vehicle in accordance with the present invention.

FIG. 6 shows one embodiment of a method for providing road condition information to a mobile vehicle in accordance with the present invention at 600.

In this embodiment, a function mathematically representing the estimate of curve 605 may be determined. Various curve-fitting methods may be used. The function is identified on the navigation server subsystem 150. The function, along with two endpoints 603, 607, may be downloaded from the server to the onboard vehicle client. The function may be evaluated with respect to time or velocity, resulting in a continuous update of road geometry information.

Figure 7:
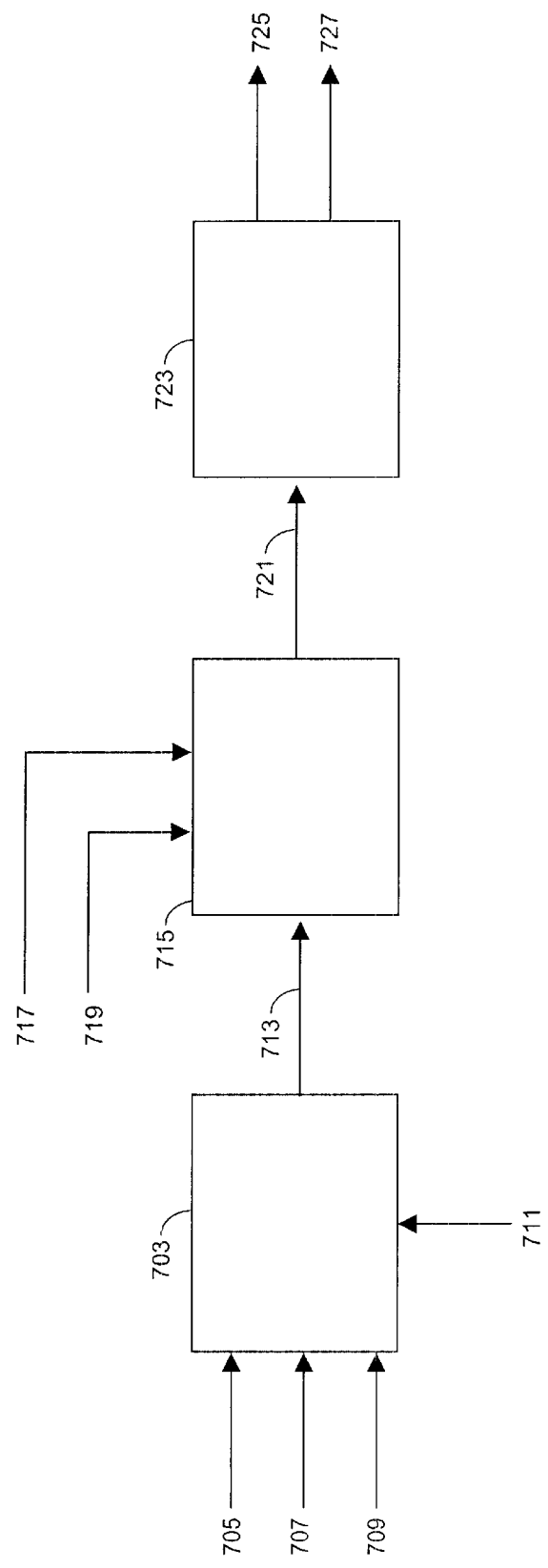
FIG. 7 is a block diagram, illustrating an example of one embodiment of a method for providing road condition information to a mobile vehicle in accordance with the present invention.

FIG. 7 shows a block diagram, illustrating one embodiment of a method for providing road condition information to a mobile vehicle in accordance with the present invention at 700.

The vehicle management system may reside on the navigation server 150 or on the vehicle client 101. In the compute suggested speed block 703, output from the first algorithm (generally shown at 400) 705, the second algorithm (generally shown at 500) 707 and the function of the third algorithm (generally shown at 600) 709 may be evaluated along with consideration of vehicle characteristics from the vehicle characteristics table input 711. The output 713 of the suggested speed block may be a speed value, which may be input into the speed comparator block 715, along with an input from the vehicle sensor suite 717 and a value of the current vehicle speed 719. Speed comparator 721 output may be passed onto the rendering block 723 where context information may be developed that may signal to the vehicle client 110 to alter the speed of the vehicle. This information may be relayed by audio indication output 725, or video indication output 727.

While the embodiments of the invention disclosed herein are presently considered preferred, various changes and modifications can be made without departing from the spirit and scope of the invention. The scope of the invention is indicated in the appended claims, and all changes that come within the meaning and range of equivalents are intended to be embraced therein.

We claim:

1. A method for providing road condition information to a mobile vehicle comprising:
   receiving a plurality of road points;
   determining a road profile value based on at least a portion of the road points;
   determining whether the road profile value exceeds a road profile threshold value;
   computing a suggested vehicle speed, when the road profile value exceeds the road profile threshold value;
   comparing the suggested vehicle speed to a sensed vehicle speed, and
   sending an excessive speed alert to the vehicle based on the comparison.

2. The method of claim 1, wherein the road points comprise shape points and maneuver points.

3. The method of claim 1, wherein the road profile threshold is downloaded from a server-based configuration table to the vehicle.

4. The method of claim 1, wherein a digital map including list of shape points, nodes and road segments is downloaded to the vehicle.

5. The method of claim 1, wherein determining the road profile value comprises determining an angle between consecutive shape points within a portion of road points.

6. The method of claim 1, wherein the suggested vehicle speed is based on the vehicle characteristics and road geography.

7. The method of claim 1, wherein determining the road profile value comprises determining a least squares estimation of a curve defined by the portion of road points.

8. The method of claim 1, wherein a road profile value is based on a severity of an undulation of a curve defined by a portion of the road points by computing an amplitude and a period.

9. The method of claim 8, wherein determining a road profile value according to a formula:
   $R = (d^*A)/D$ where R represents the severity of curve undulation, d represents the degree of polynomial used to fit the curve defined by the portion of points, A represents the average perpendicular distance from peaks and troughs from the x axis and D represents the distance between the east-most shape point and the west-most shape point on the curve defined by the portion of road points.

10. The method of claim 1, wherein determining the road profile value comprises continuously evaluating a mathematical representation of the estimated curve downloaded to the vehicle client.

11. The method of claim 9, wherein the mathematical representation of the estimated curve is evaluated as a function of time or velocity.

12. The method of claim 1, wherein the sensed vehicle speed is determined by measuring a distance navigated during a specified amount of time.

13. The method of claim 1 wherein the excessive speed alert comprises an audio sound.

14. The method of claim 1, wherein the excessive speed alert comprises a visual indication.

15. A computer usable medium including a program for providing road condition information to a mobile vehicle comprising:
   computer readable program code that determines a road profile value based on at least a portion of received road points;
   computer readable program code that determines whether the road profile value exceeds a road profile threshold value;
   computer readable program code that computes a suggested vehicle speed, if the road profile value exceeds the road profile threshold value;
   computer readable program code that compares the suggested vehicle speed to a sensed vehicle speed; and
   computer readable program code that sends an excessive speed vehicle alert based on the comparison.

16. The computer usable medium of claim 15, wherein a road profile value is based on a severity of an undulation of a curve defined by a portion of the road points by computing an amplitude and a period.

17. The computer usable medium of claim 15, wherein computer readable program code that determines the suggested vehicle speed comprises downloading vehicle characteristics from a navigation system server based configuration table and computing based on determined road geography.

18. The computer usable medium of claim 15, wherein determining the road profile value comprises continuously evaluating a mathematical representation of the estimated curve downloaded to the vehicle client.

19. The computer usable medium of claim 15, wherein the sensed vehicle speed is determined by measuring a distance navigated during a specified amount of time.

20. A system for providing road condition information to a mobile vehicle comprising:
   means for receiving a plurality of road points;
   means for determining a road profile value based on at least a portion of the road points;
   means for determining whether the road profile value exceeds a road profile threshold value;
   means for computing a suggested vehicle speed when the road profile value exceeds the road profile threshold value;
   means for comparing the suggested vehicle speed to a sensed vehicle speed, and
   means for sending an excessive speed alert to the vehicle based on the comparison.

* * * * *